United States Patent
Jain et al.

(10) Patent No.: US 6,912,589 B1
(45) Date of Patent: Jun. 28, 2005

(54) SYSTEM AND METHOD FOR EFFICIENTLY HANDLING MULTICAST PACKETS BY IGNORING VLAN CONTEXT

(75) Inventors: Vipin Kumar Jain, Santa Clara, CA (US); Peter Si-Sheng Wang, Cupertino, CA (US)

(73) Assignee: 3Com Corportion, Santa Clara, CA (US)

( * ) Notice: Subject to any disclaimer, the term of this patent is extended or adjusted under 35 U.S.C. 154(b) by 0 days.

(21) Appl. No.: 09/281,726

(22) Filed: Mar. 30, 1999

(51) Int. Cl.[7] .................. H04L 12/28; G06F 15/16
(52) U.S. Cl. ................ 709/238; 709/242; 370/389; 370/392; 370/395.53
(58) Field of Search .................. 709/238, 239, 709/242, 245, 218, 220; 370/389, 390, 392, 393, 235, 395.53

(56) References Cited

U.S. PATENT DOCUMENTS

| | | | | |
|---|---|---|---|---|
| 5,892,912 A | * | 4/1999 | Suzuki et al. | 709/218 |
| 5,892,922 A | * | 4/1999 | Lorenz | 709/238 |
| 6,188,691 B1 | * | 2/2001 | Barkai et al. | 370/390 |
| 6,208,649 B1 | * | 3/2001 | Kloth | 370/392 |
| 6,343,289 B1 | * | 1/2002 | Hunter et al. | 707/10 |
| 6,570,875 B1 | * | 5/2003 | Hegde | 370/389 |

OTHER PUBLICATIONS

Cisco VLAN Roadmap. www.cisco.com/warp/public/538/7.html, Jul. 17, 1995.*

* cited by examiner

*Primary Examiner*—Dung C. Dinh (57) ABSTRACT

A method and system for efficiently handling forwarding of multicast packets by ignoring VLAN (virtual local area network) context during lookup. In one embodiment, the present invention receives, at an intermediate device, multicast registration information for a client. The present embodiment then creates a forwarding database of the multicast registration information. In the present embodiment, when handling a multicast packet at an intermediate device, the present invention accesses the multicast registration information stored in the forwarding database. More particularly, in this embodiment, the present invention accesses the multicast registration information stored in the forwarding database without utilizing VLAN context of the client. As a result, the present invention allows the intermediate device to forward a single multicast packet which will later be supplied to registered member ports. The member ports apply the appropriate VLAN context. In so doing, the present invention prevents unnecessary replication of multicast packets and avoids superfluous expensive lookups in multicast registration tables.

17 Claims, 5 Drawing Sheets

|   400

| IP Address | Port Membership |
|---|---|
|  |  |
|  |  |
|  |  |
|  |  |
|  |  |
|  |  |
|  |  |

| IP Address | VLAN Identification | Port Membership |
|---|---|---|
|  |  |  |
|  |  |  |
|  |  |  |
|  |  |  |
|  |  |  |
|  |  |  |
|  |  |  |

SYSTEM AND METHOD FOR EFFICIENTLY HANDLING MULTICAST PACKETS BY IGNORING VLAN CONTEXT

TECHNICAL FIELD

The present invention generally pertains to the field of computer networking. More particularly, the present invention is related to multicast packet handing.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

Computer networks can be arranged in numerous configurations comprising a variety of network types. Some of the most popular types of networks comprise Ethernet (coaxial cable or twisted-pair cable), token ring, Fiber Distributed Data Interface (FDDI), Frame Relay, Integrated Services Digital Network (ISDN), X.25, Synchronous Data Link Control (SDLC). Typically, these networks are arranged in local area networks (LANs) and wide area networks (WANs). Usually, LANs are distinguished from WANs based upon the geographical area they cover and sometimes the number of users connected to the network. For example, a group of personal computers (PCs) in a home or single business site (location) usually communicate with each other over a LAN. Groups of PCs disposed remote from one another, such as those in different homes, different companies, or different branch offices of the same company, typically communicate with each other over a WAN.

Presently, an Institute of Electrical and Electronics Engineering (IEEE) draft standard, 802.1Q, defines a mechanism to identify and classify packets in a VLAN (virtual local area network) environment. Currently, the standard defines a method to classify packets into VLANs (if they are not already classified) based on the incoming ports, also known as port-based VLAN classification system. In a typical configuration containing various intermediate devices (i.e. switches, routers, and the like), VLANs map one-to-one to subnets. Additionally, such VLANs are used to segregate device ports (e.g. client device ports) into separate broadcast domains. Such an approach contains the broadcast and unknown packets to only those ports that are in the same subnet. While this mechanism works fine for unicast packets, multicast forwarding is quite extensive. That is, conventional intermediate devices operating under existing protocols are often forced to replicate multicast packets.

More specifically, in a conventional prior art approach, an intermediate device receives multicast group membership registrations in different VLANs records this information for forwarding purposes in a forwarding database. In 802.1Q-compliant intermediate devices, the MAC (media access control) address and the receiving VLAN identification (VID) are used together to index such a database to identify the outbound ports. In existing prior art approaches, when an intermediate device receives a multicast packet, the intermediate device must search the forwarding database for all the members in all possible VLANs. The conventional intermediate device then forwards the multicast packet separately to each registered VLAN. Such a conventional method is complicated and expensive to implement in ASICs (application specific integrated circuit). As yet a more egregious disadvantage, such a conventional method also frequently results in wasteful replication of a multicast packet. That is, the conventional intermediate device must make multiple copies of the same multicast packet and then forward the multiple copies out a single port to which registered members in multiple VLANs are coupled. In some attempts to alleviate this problem, practitioners have resort to easier (but slower) software based forwarding of multicast packets.

In addition to the disadvantages associated with replication of multicast packets, the required lookups in the forwarding database have significant drawbacks associated therewith. That is, conventional approaches require the intermediate device to perform at least one lookup in the forwarding database for all potentially registered VLANs. These lookups are expensive in CPU (central processing unit) cycles, memory space, and intermediate device performance.

Thus, a need exists for a method and system which eliminates unnecessary replication of multicast packets. Still another need exists for a method and system which reduces superfluous expensive lookups in multicast registration tables. Still another need exists for a system and method which meets the above-listed needs but which operates effectively in a VLAN environment.

DISCLOSURE OF THE INVENTION

The present invention provides a method and system which eliminates unnecessary replication of multicast packets. The present invention further provides a method and system which reduces superfluous expensive lookups in multicast registration tables. The present invention also provides a system and method which achieves the above-listed accomplishments and which operates effectively in a VLAN environment.

In one embodiment the present invention receives, at an intermediate device, multicast registration information for a client. The present embodiment then creates a forwarding database of the multicast registration information. In the present embodiment, when handling a multicast packet at an intermediate device, the present invention accesses the multicast registration information stored in the forwarding database. More particularly, in this embodiment, the present invention accesses the multicast registration information stored in the forwarding database without utilizing VLAN context of the client. As a result, the present invention allows the intermediate device to forward a single multicast packet which will later be supplied to registered member ports. In so doing, the present invention prevents unnecessary replication of multicast packets and avoids superfluous expensive lookups in multicast registration tables.

In another embodiment, the present invention includes the features of the above embodiment and specifically does not store VLAN context of the client. As a result, the forwarding database contains less data than a conventionally structured forwarding database, occupies less memory than a conventional forwarding database, and can be utilized with a less complex lookup engine.

In still another embodiment, the present invention includes the features of the first-listed above embodiment, and specifically does store VLAN context of the client. However, when accessing the forwarding database, the present embodiment deliberately ignores the VLAN context information stored therein. As a result, lookups in the forwarding database are simplified and expedited.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "creating", "handling", "accessing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers. Although the present application will refer to a computer system, for purposes of the present application, a computer system is intended to refer to, for example, an intermediate device such as a network switch, router, and the like. Hence, the following discussion which refers to processes performed by a computer system also pertains to processes performed by an intermediate device or a plurality of intermediate devices.

Computer System Environment of the Present Invention

Figure 1:
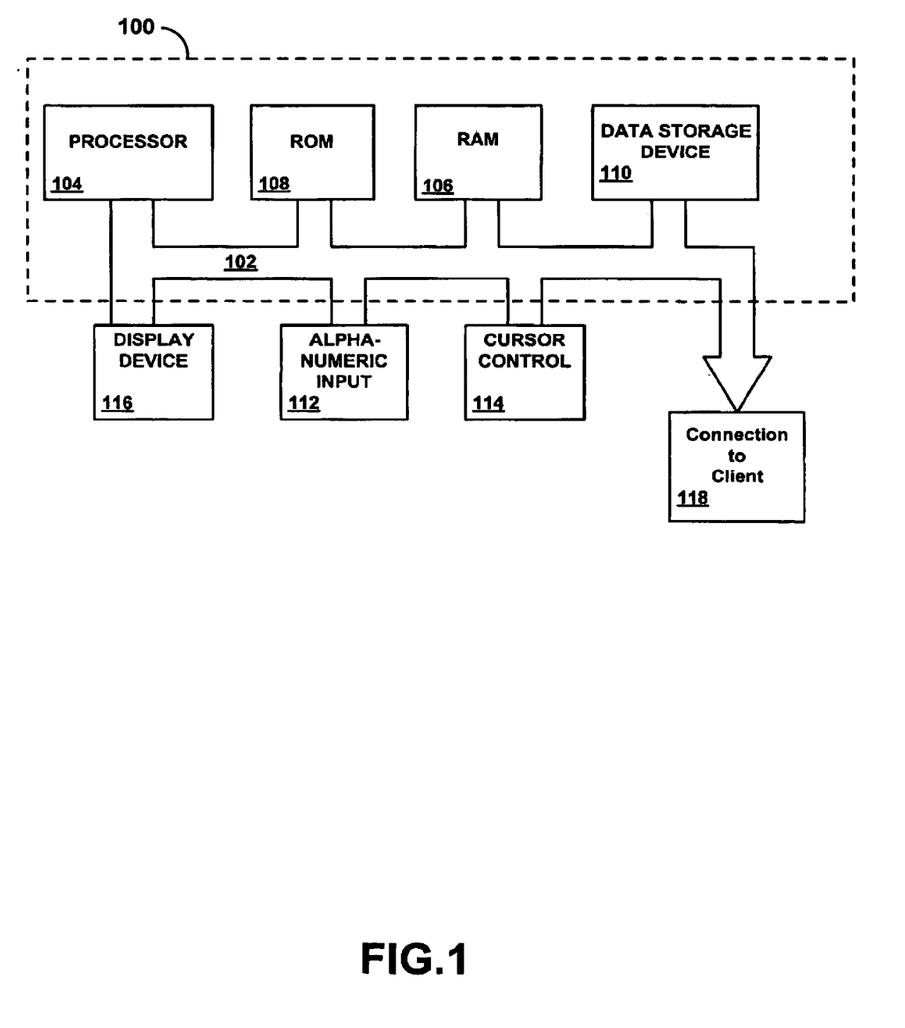
FIG. 1 is a schematic diagram of an exemplary computer system used to perform steps of the present method in accordance with one embodiment of the present invention.

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is exemplary only and that the present invention can operate within a number of different computer systems including general purpose networked computer systems, embedded computer systems, and stand alone computer systems. Furthermore, as will be described below in detail, the components of computer system 100 reside, for example, in a client computer and/or in the intermediate device of the present system and method. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80×86-family microprocessor. System 100 also incudes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information. Additionally, computer system 100 of the present embodiment includes feature 118 for connecting computer system 100 (e.g. intermediate device 210 of FIG. 2) to a client.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

DETAILED DESCRIPTION OF THE ENVIRONMENT OF THE PRESENT INVENTION

Figure 2:
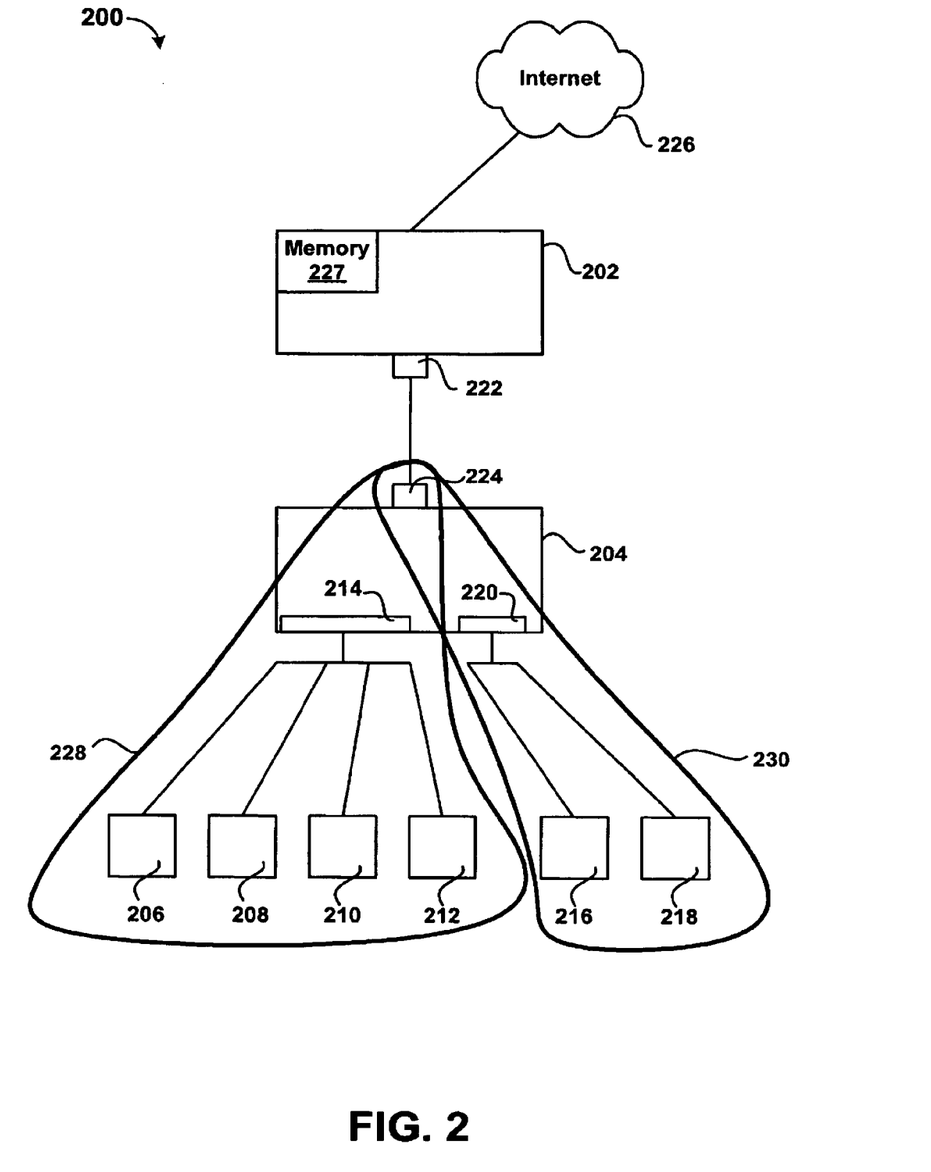
FIG. 2 is a schematic representation of a network architecture in which is employed a system and method for efficiently handling multicast packets by ignoring VLAN context in accordance with one embodiment of the present invention.

With reference now to FIG. 2, a schematic representation of a network architecture 200 in which is employed a method and system for efficiently handling multicast packets by ignoring VLAN (virtual local area network) context during lookup in accordance with one embodiment of the present invention is shown. The present discussion will begin with a detailed description of the structure and physical components relevant to the present invention. The discussion will then describe, in detail, the operation of the components of network architecture 200 and the various embodiments of the present invention. Referring again to FIG. 2, network architecture 200 includes an intermediate device 202 which is coupled to another intermediate device 204. In the present embodiment intermediate device 202 is for example, a layer 3 device such as a router. Similarly, in the present embodiment intermediate device 204 is a layer 2 device such as a switch (the present embodiment is also well suited to a layer 3 switch). The present invention is however well suited to use with various types of intermediate devices residing at various layers. Network architecture 200 of the present embodiment also includes clients 206, 208, 210, and 212 which are coupled to port 214 of intermediate device 204. Network architecture 200 of the present embodiment also includes clients 216 and 218 which are coupled to port 220 of intermediate device 204. Furthermore, as shown in FIG. 2, port 222 of intermediate device 202 is used to couple intermediate device 202 to port 224 of intermediate device 204. FIG. 2 also shows the Internet 226 coupled to intermediate device 202.

It will be understood that numerous other components may be present between intermediate device 202 and Internet 226 and numerous other components will exist in a typical network architecture. For purposes of clarity, the various other components are not shown in FIG. 2. Intermediate device 202 includes memory 227 such as, for example, ROM 108 and/or RAM 106 of FIG. 1. Although memory 227 is shown integral with intermediate device 202 in the embodiment of FIG. 2, the present invention is also well suited to an embodiment in which memory 227 is located separately from, but still accessible by, intermediate device 202.

Referring still to FIG. 2, a typical intermediate device such as intermediate device 202 or 204 may have less or considerably more ports, however, for purposes of clarity only 6 ports 206, 208, 210, 212, 216, and 218 are shown in FIG. 2. In architecture 200 of FIG. 2, clients 206, 208, 210, 212, 216, and 218 are personal computers (PCs), however, although the clients are PCs in network architecture 200, the present invention is also well suited to an embodiment in which clients 206, 208, 210, 212, 216, and 218 are comprised of devices other than PCs (e.g. personal digital assistants, servers, and the like). Additionally, although only six clients 206, 208, 210, 212, 216, and 218 are shown for purposes of clarity, the present invention is also well suited to a use with a system having a greater or lesser number of clients. Also, intermediate devices 204 and 202 of the present embodiment may contain, for example, some of the features of computer system 100 described above in detail in conjunction with FIG. 1.

With reference still to FIG. 2, clients 206, 208, 210, and 212 coupled to port 214 of intermediate device 204 reside within a common VLAN 228. Clients 216 and 218 coupled to port 220 of intermediate device 204 reside within a common VLAN 230. Hence VLAN 228 and VLAN 230 are accessed through common ports 224 and 222 of intermediate devices 204 and 202, respectively.

DETAILED DESCRIPTION OF THE OPERATION OF THE PRESENT INVENTION

Figure 3:
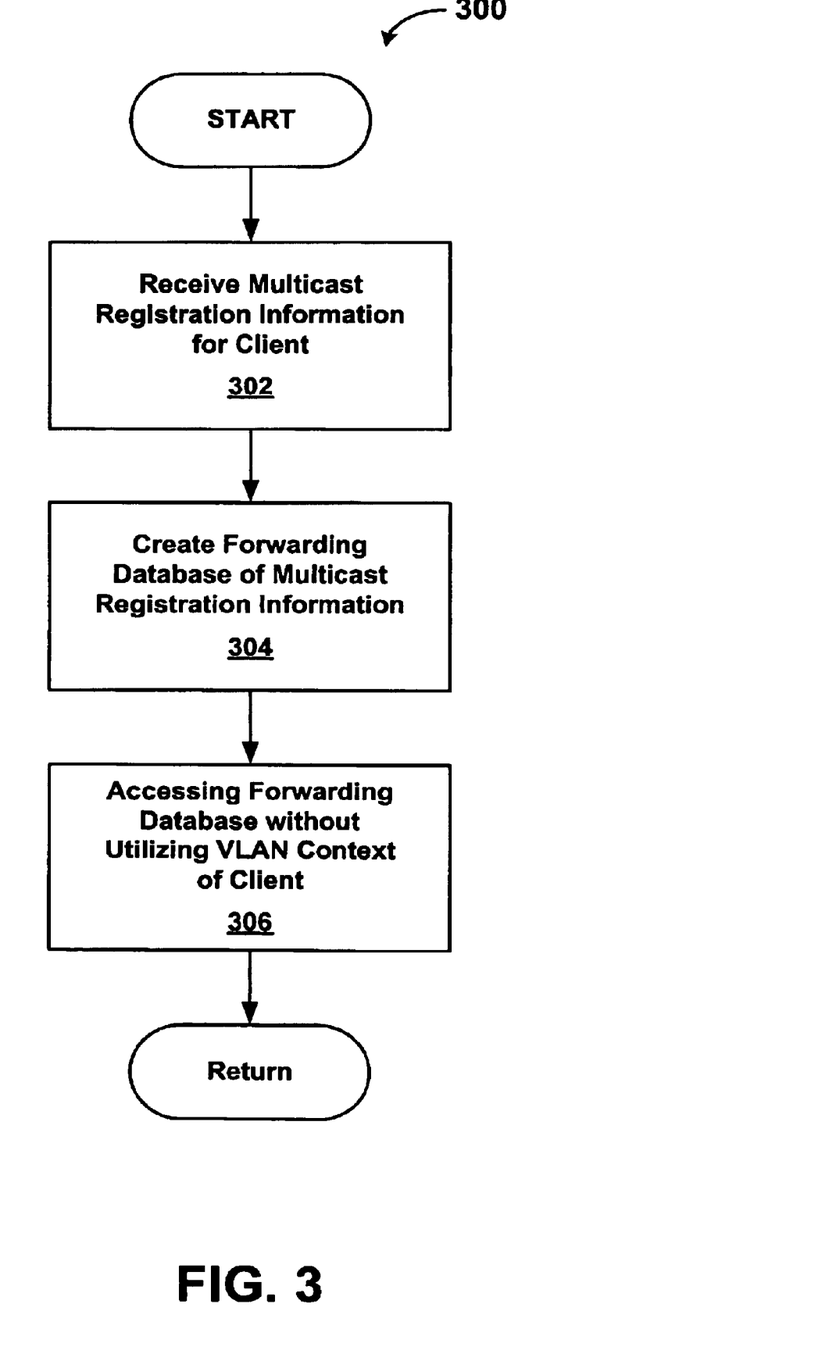
FIG. 3 is a flow chart of steps performed in accordance with one embodiment of the present claimed invention.

With reference next to FIG. 3, a flow chart 300 of exemplary steps performed in one embodiment of the present invention is shown. Flow chart 300 includes processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1 physically residing, for example, in intermediate device 202 of FIG. 2. The computer-readable and computer-executable instructions are used to control or operate in conjunction with, for example, central processing unit 104 of FIG. 1. As mentioned above, the features of the computer system of FIG. 1 are well suited to being disposed, for example, in intermediate device 202. Although specific steps are disclosed in flow chart 300 of FIG. 3, such steps are exemplary. That is, the present invention is well suited to performing various other steps or variations of the steps recited in FIG. 3.

The steps of the present embodiment will be described in conjunction with the physical components of FIG. 2. As an overview, the following discussion pertain to the operation of intermediate device 202 in conjunction with intermediate device 204 and clients 206, 208, 210, 212, 216 and 218 coupled thereto. Specifically, in the embodiments of the present invention, intermediate device 202 efficiently handles multicast packets by ignoring VLAN (virtual local area network) context during lookup. In so doing, the present invention prevents unnecessary replication of multicast packets and avoids superfluous expensive lookups in multicast registration tables.

Referring now to step 302, the present embodiment receives multicast registration information from respective clients (either via e.g. an IGMP report or routing update). More particularly, in the present embodiment, intermediate device 202 receives multicast registration information from clients 206, 208, 210, 212, 216 and 218 via an Internet Group Management Protocol (IGMP) registration. Although an IGMP registration protocol is specifically mentioned in the present embodiment, the present invention is also well suited to embodiments in which various other methods are used to convey multicast registration information from clients 206, 208, 210, 212, 216 and 218 to intermediate device 202.

Next, at step 304, the present embodiment creates a forwarding database of the received multicast registration information. In one embodiment, the present invention creates a forwarding database of the multicast registration information wherein the forwarding database does not contain VLAN context. Instead, only port membership and IP (Internet protocol) address information is stored in memory (e.g. memory 227 of FIG. 2). The port membership information recites all of the ports on which a registration was received for a multicast group. As will be described below in detail, although the present embodiment "ignores" the VLAN context during lookup (and, in some embodiments, during creation of the forwarding database), the present embodiment may still consider the VLAN context during forwarding of a received multicast packet from ports 214 and 220 to coupled clients. Furthermore, in some embodiments, intermediate device 204 will contain memory, not shown, for storing VLAN tagging information.

Figure 4:
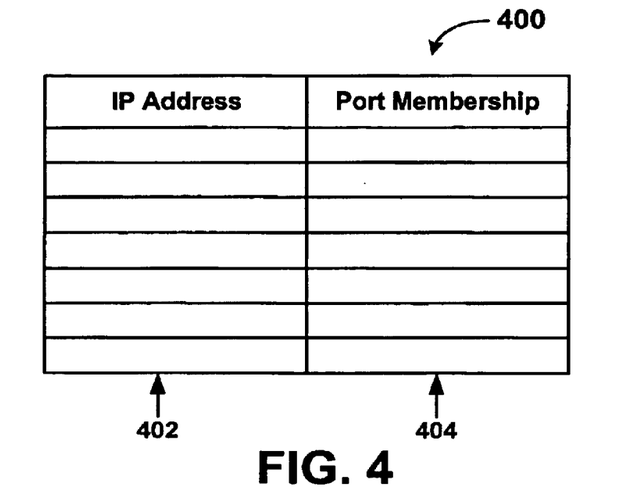
FIG. 4 is a forwarding database table in which VLAN context is not stored in accordance with one embodiment of the present claimed invention.

Referring still to step 304, a forwarding database which does not contain VLAN context is shown in table 400 of FIG. 4. As shown in FIG. 4, table 400 contains an IP address column 402, and a port membership column 404. Thus, the present embodiment eliminates the need to store VLAN context. As a result, the forwarding database of the present embodiment contains less data than a conventionally structured forwarding database, occupies less memory than a conventional forwarding database, and can be utilized with a less complex lookup engine.

Figure 5:
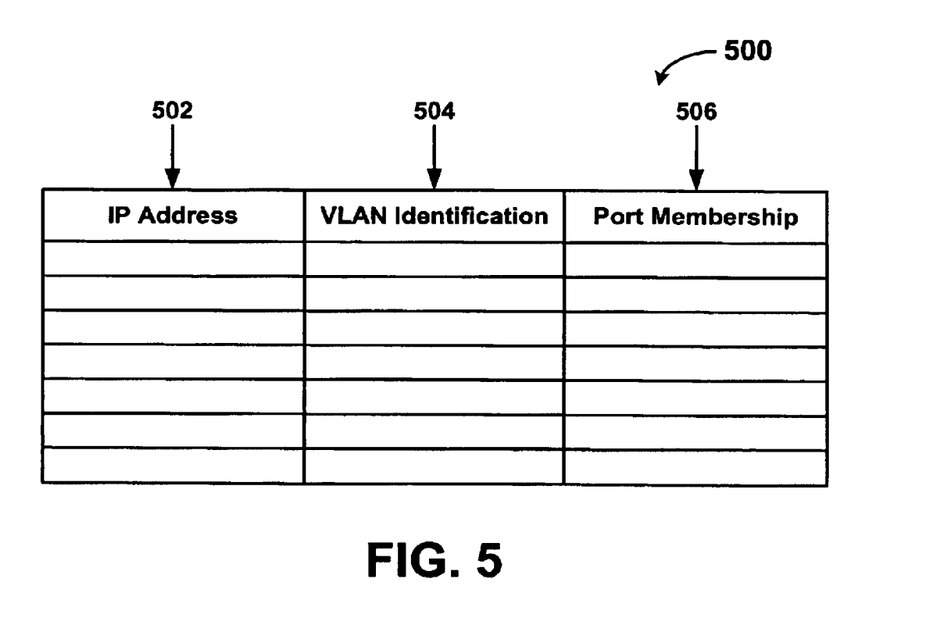
FIG. 5 is a forwarding database table in which VLAN context is stored in accordance with one embodiment of the present claimed invention.

Referring still to step 304, in another embodiment, the present invention creates a forwarding database of the multicast registration information wherein the forwarding database does contain VLAN context. In such an embodiment, port membership, IP address information, and VLAN context is stored in memory (e.g. memory 227 of FIG. 2). A forwarding database which does contain VLAN context is shown in table 500 of FIG. 5. As shown in FIG. 5, table 500 contains an IP address column 502, and VLAN context column 504, and a port membership column 506. As will be described in detail below, in such an embodiment the present invention will ignore the VLAN context when accessing the forwarding database. Although specific formats are shown in tables 400 and 500, the present invention is also well suited to embodiments having various other table formats, and to embodiments in which the data of tables 400 and 500 is not stored contiguously, in which the data is stored at various separate locations, and the like.

With reference now to step 306, the present embodiment then accesses the multicast registration information stored in the forwarding database without utilizing VLAN context. In an embodiment utilizing a forwarding database which includes VLAN context (e.g. table 500), the present embodiment ignores the VLAN context during lookup. As a result, lookups in the forwarding database are simplified and expedited.

Hence during operation, when an IP multicast packet is received at intermediate device 202 from, for example, Internet 226, intermediate device 202 performs a lookup. More particularly, intermediate device 202 performs a lookup ignoring the VLAN context. Thus, unlike conventional approaches in which an intermediate device performs a first lookup for a first VLAN, a second lookup for a second VLAN, and a third lookup for a third VLAN, and so on, intermediate device 202 of the present embodiment performs only a single lookup regardless of the number of VLANs. If intermediate device 202 accesses a forwarding database configured as shown in table 400, no VLAN context information is present. If, however, intermediate device 202 accesses a forwarding database configured as shown in table 500, the lookup engine of intermediate device 202 will ignore the VLAN context information.

After receiving the IP multicast packet and performing the single lookup, intermediate device 202 forwards the multicast packet (without requiring replication thereof) through port 222 and port 224 of intermediate device 204 such that ports 214 and 220 will receive the multicast packet. That is, intermediate device 202 forwards the multicast packet to all the member ports without regard for their VLAN membership. In so doing, the present invention prevents unnecessary replication of multicast packets and avoids superfluous expensive lookups in multicast registration tables.

Continuing with the present example, once the multicast packet is received at ports 214 and 220, ports 214 and 220 apply the VLAN context and transmit the multicast packet to the necessary clients (e.g. clients 206, 208, 210, 212, 216, and 218). Furthermore, in one embodiment ports 214 and 220 forward the multicast packet either tagged or untagged as indicated by the "untag" specification for the PVID (port VLAN identification) in the egress list. Thus, in one embodiment, the multicast packet carries an indication so that ports 212 and 220 understand that they need to apply the VLAN context. In one embodiment the indication is an internal VID (VLAN identification) or absence of a tag that the packet is tagged with when traversing the internal bus. However, the present invention is also well suited to employing various other implementation dependent parameters carried in the packet or set on a port in order to determine whether VLAN tagging by ports 212 and 220 is required. Such implementation dependent parameters are stored, for example, in memory, not shown, of intermediate device 204.

Figure 6:
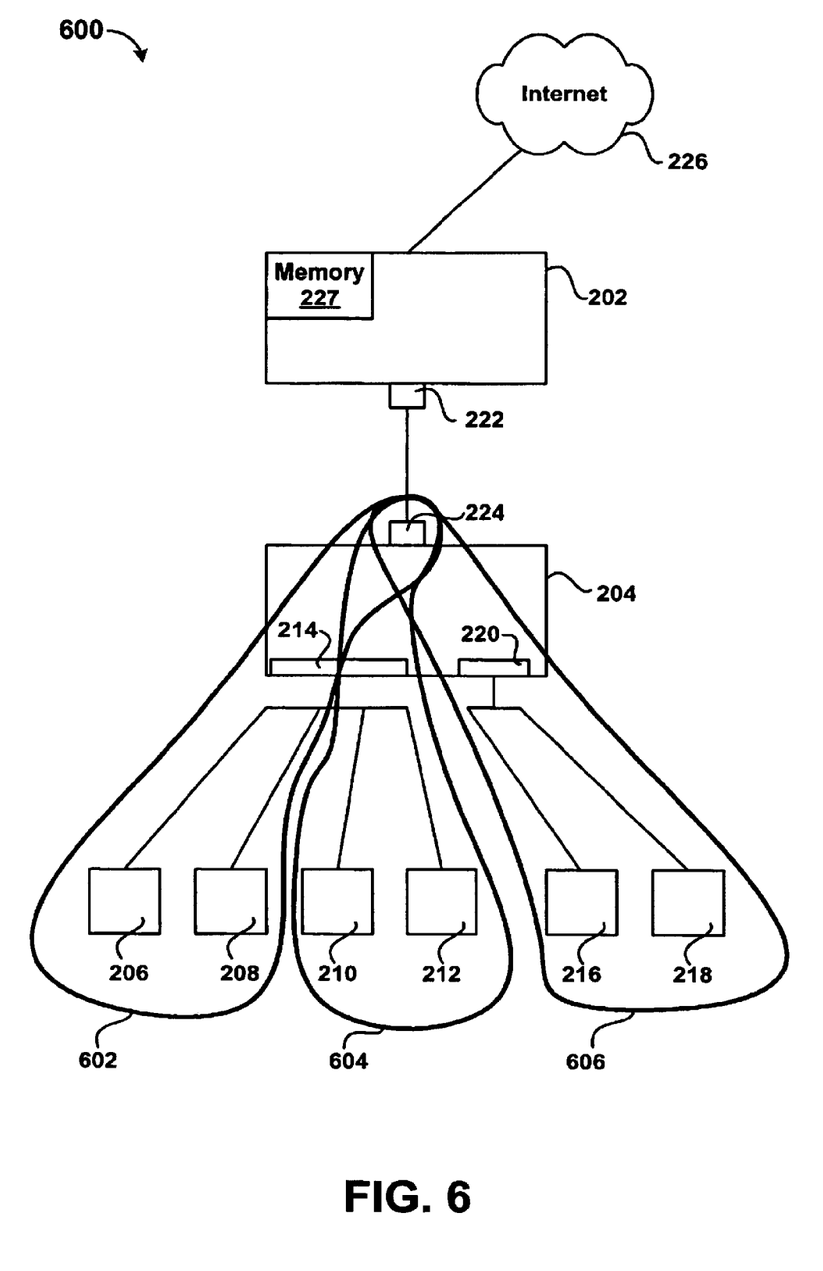
FIG. 6 is a schematic representation of a network architecture having multiple VLANs coupled to a single port in which is employed a system and method for efficiently handling multicast packets by ignoring VLAN context in accordance with one embodiment of the present invention.

With reference now to FIG. 6, a schematic representation of another network architecture 600 in which is employed a method and system for efficiently handling multicast packets by ignoring VLAN (virtual local area network) context during lookup in accordance with one embodiment of the present invention is shown. The embodiments described above work well in situations when, for example, ports 214 and 220 have only a single VLAN coupled thereto and the only VLAN Id configured in the egress list of a port is PVID of the port. However, on a port carrying multiple VLANs, a packet arriving without any tagging (i.e. having no VLAN context applied thereto) will be ambiguous. As shown in the embodiment of FIG. 6, three VLANs 602, 604, and 606 are present. VLANs 602 and 604 share port 214, while VLAN 606 is coupled to port 220. Thus, if a multicast packet is forwarded from intermediate device 202 to port 214 using the implementation described above, it will not be possible to determine whether the packet is for VLAN 602, VLAN 604, or both. Hence, following discussion describes the operation of the present invention under such conditions.

With reference still to FIG. 6, when a multi-VLAN port is present (e.g. port 214) the present embodiment operates as follows. Although the egress list for a multi-VLAN port contains multiple VIDs, if registration has been received for only one VLAN, then the present embodiment operates in the same manner as was described above for single-VLAN ports with the exception that the VLAN context is of the registered VLAN and not necessarily of the port VID (PVID). However, in such an embodiment VID tagging by the port may or may not be required depending upon the "untag" specification for the VLAN in which the registration was received. Additionally, in the present embodiment, port memory storing either the PVID or VLAN in which the VLAN was received facilitates correct forwarding on multi-VLAN ports with a single registration.

Thus, the present invention provides a method and system which eliminates unnecessary replication of multicast packets. The present invention further provides a method and system which reduces superfluous expensive lookups in multicast registration tables. The present invention also provides a system and method which achieves the above-listed accomplishments and which operates effectively in a VLAN environment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the claims appended hereto and their equivalents.

What is claimed is:

1. A system for efficiently handling a multicast packet in a VLAN (virtual local area network) environment, said system comprising:
    a plurality of clients;
    a first intermediate device comprising a plurality of ports coupled to said plurality of clients; and
    a second intermediate device comprising a memory for storing multicast registration information and communicatively coupled with said first intermediate device, said second intermediate device for performing a single look-up of said multicast registration information of said plurality of clients stored by said memory and for broadcasting said multicast packet to said plurality of ports of said first intermediate device.

2. The system of claim 1 for efficiently handling a multicast packet in a VLAN environment wherein said memory is integral with said second intermediate device.

3. The system of claim 1 for efficiently handling a multicast packet in a VLAN environment wherein said second intermediate device is configured to not store a VLAN context of said plurality of clients in said memory when storing said multicast registration information for said plurality of clients.

4. The system of claim 1 for efficiently handling a multicast packet in a VLAN environment wherein, when said intermediate device handles said multicast packet, said intermediate device is configured to ignore said VLAN context of said client stored in said memory with said multicast registration information for said client.

5. A communications device which efficiently handles a multicast packet in a VLAN (virtual local area network) environment, said communications device comprising:
    a first communicative coupling with a first device comprising a plurality of ports adapted to be coupled to a plurality of clients that are logically coupled in a plurality of VLANs;
    a second communicative coupling with a second communications device comprising an integral memory wherein multicast registration information comprising a port membership and an Internet protocol (IP) address for each of said plurality of clients is stored, said communications device adapted to perform a single lookup of said multicast registration information for said plurality of clients without utilizing VLAN context of said plurality of clients and for broadcasting said multicast packet to each of said ports described in said multicast registration information.

6. The communications device of claim 5 which efficiently handles a multicast packet in a VLAN environment wherein said second communications device is configured to not store said VLAN context of said plurality of clients in said memory when storing said multicast registration information for said plurality of clients.

7. The communication device of claim 5 which efficiently handles a multicast packet in a VLAN environment wherein, when said communication device handles said multicast packet, said communication device is configured to ignore said VLAN context of said client which is stored in said memory with said multicast information for said client.

8. A method for efficiently handling a multicast packet in a VLAN (virtual local area network) environment at an intermediate device, said method comprising the steps of:
    a) receiving, at said intermediate device, multicast registration information for a plurality of clients that are logically coupled in a plurality of VLANs;
    b) creating a forwarding database of said multicast registration information, wherein said multicast registration information comprises a port membership and an Internet protocol (IP) address for each of said plurality of clients and storing said database using an integral memory;
    c) when handling said multicast packet at said intermediate device, performing a single lookup to access said multicast registration information stored in said forwarding database without utilizing VLAN context of said plurality of clients; and
    d) simultaneously sending said multicast packet to a plurality of clients via a plurality of ports communicatively described in said forwarding database and coupled to said intermediate device via a second intermediate device.

9. The method for efficiently handling a multicast packet in a VLAN environment as recited in claim 8 wherein step b) comprises:

creating a forwarding database of said multicast registration information without storing said VLAN context of said plurality of clients in said forwarding database.

10. The method for efficiently handling a multicast packet in a VLAN environment as recited in claim 8 wherein step b) further comprises:

b1) storing said port membership information for said plurality of clients in a database separate from said forwarding database.

11. The method for efficiently handling a multicast packet in a VLAN environment as recited in claim 8 wherein step c) comprises:

when handling said multicast packet at said intermediate device, ignoring said VLAN context of said client, wherein said VLAN context of said client is stored in said forwarding database.

12. The method for efficiently handling a multicast packet in a VLAN environment as recited in claim 8 comprising:

performing steps a) through c) when an egress list for a multi-VLAN port contains only a single VLAN identification.

13. In a computer system having a processor coupled to a bus, a computer readable medium coupled to said bus and having stored therein a computer program that when executed by said processor causes said computer system to implement a method for efficiently handling a multicast packet in a VLAN environment, said method comprising the steps of:

a) receiving, at an intermediate device, multicast registration information for a plurality of clients that are logically coupled in a plurality of VLANs;

b) creating a forwarding database of said multicast registration information, wherein said multicast registration information comprises a port membership and an Internet protocol (IP) address for each of said plurality of clients and storing said database using an integral memory;

c) when handling said multicast packet at said intermediate device, performing a single lookup to access said multicast registration information stored in said forwarding database without utilizing VLAN context of said plurality of clients; and d) simultaneously sending said multicast packet to a plurality of clients via a plurality of ports described in said forwarding database and communicatively coupled to said intermediate device via a second intermediate device.

14. The computer readable memory unit as described in claim 13 wherein step b) of said computer implemented method stored on said computer readable medium further comprises:

creating a forwarding database of said multicast registration information without storing said VLAN context of said plurality of clients in said forwarding database.

15. The computer readable memory unit as described in claim 13 wherein step b) of said computer implemented method stored on said computer readable medium further comprises:

b1) storing said port membership information for said client in a database separate from said forwarding database.

16. The computer readable memory unit as described in claim 13 wherein step c) of said computer implemented method stored on said computer readable medium further comprises:

when handling said multicast packet at said intermediate device, ignoring said VLAN context of said client, wherein said VLAN context of said client is stored in said forwarding database.

17. The computer readable memory unit as described in claim 13 wherein said computer implemented method stored on said computer readable medium further comprises:

performing steps a) through c) when an egress list for a multi-VLAN port contains a single VLAN identification.

* * * * *